May 2, 1939.　　　　B. E. MILLER　　　　2,156,636
ELECTRICAL CONTROL SYSTEM
Filed March 3, 1938　　　2 Sheets-Sheet 1
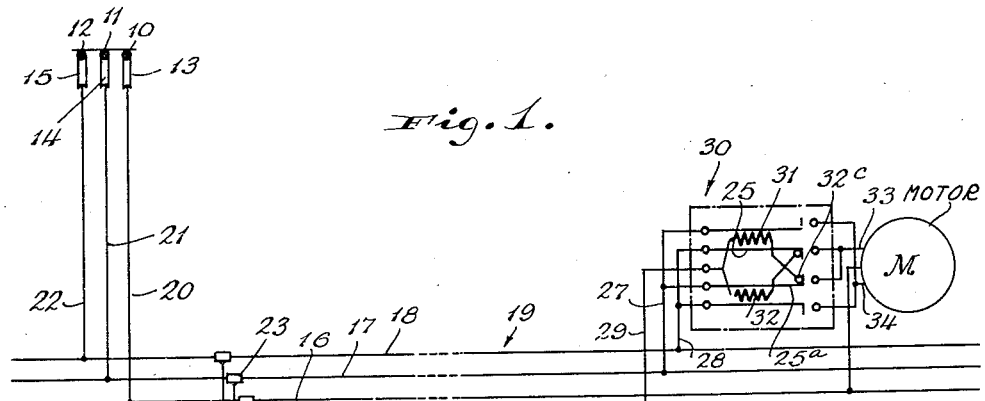
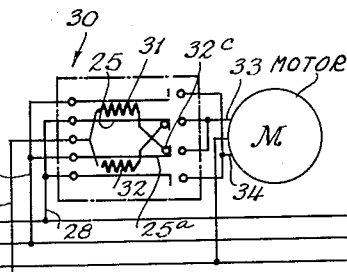
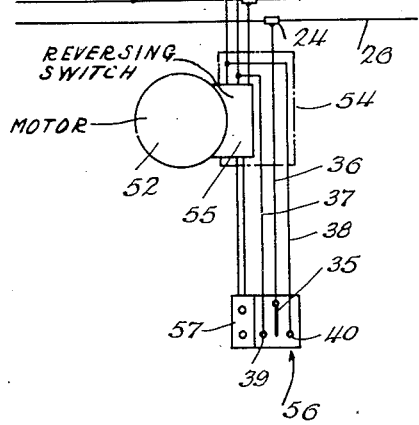
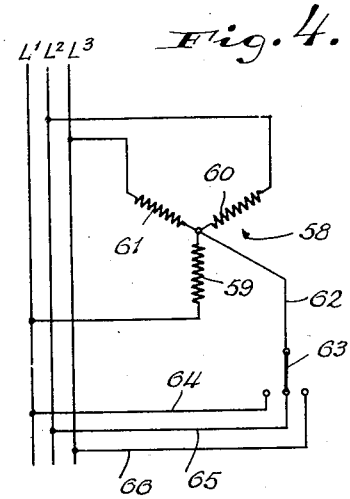
INVENTOR.
BEMIS E. MILLER
BY
ATTORNEYS

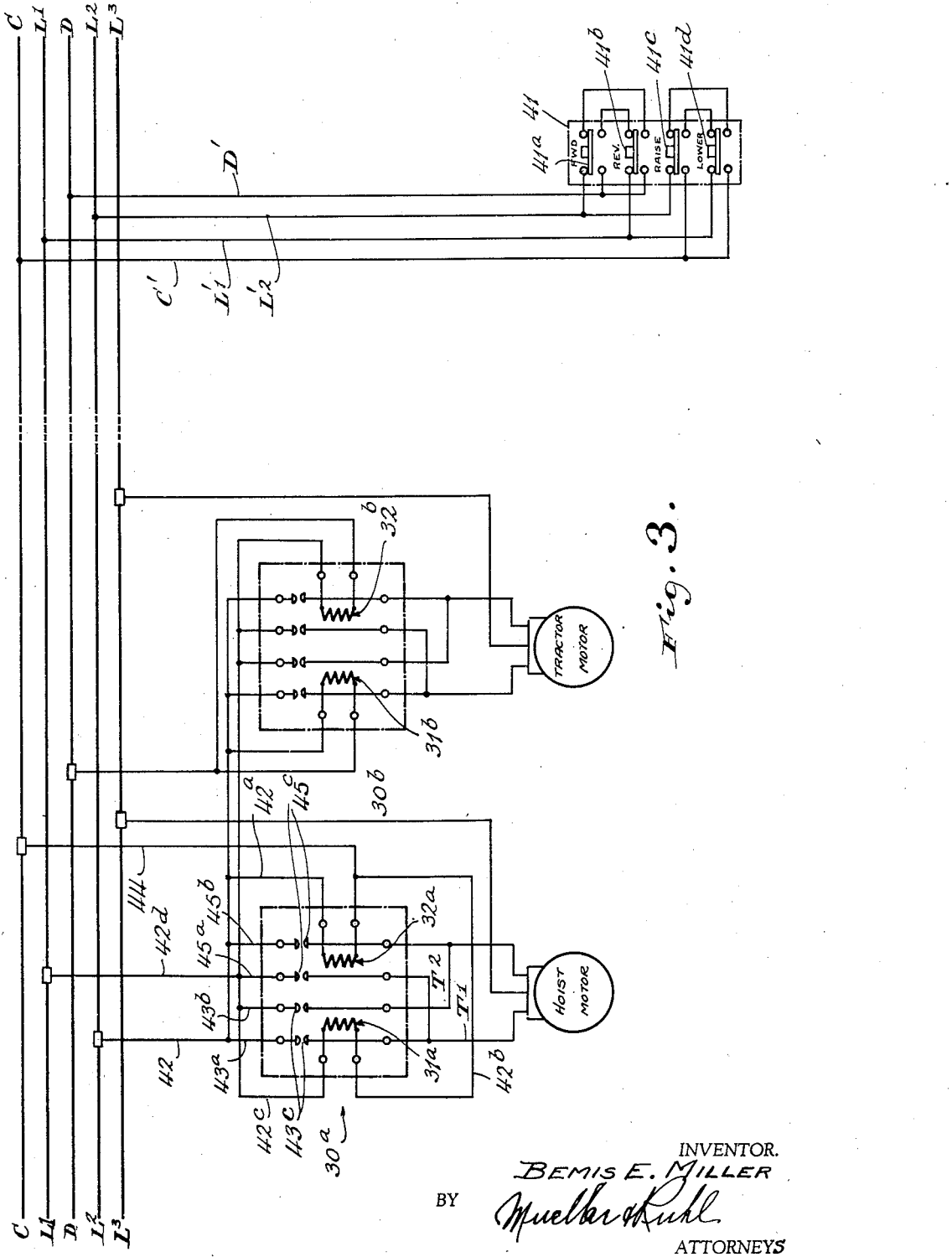

Patented May 2, 1939

2,156,636

UNITED STATES PATENT OFFICE 2,156,636

ELECTRICAL CONTROL SYSTEM

Bemis E. Miller, Salamanca, N. Y., assignor to The American Monorail Company, Cleveland, Ohio, a corporation of Ohio Application March 3, 1938, Serial No. 193,657

11 Claims. (Cl. 172—179)

My invention relates to control systems for electric motors, more especially polyphase alternating-current motors, and particularly to systems of remote control of motors of conveyor systems.

It is an object of my invention to provide an arrangement in which a reversible motor may be energized for rotation in either sense, and deenergized, from a remote control station with need to provide only a single conductor, other than the power-line conductors, between electromagnetic means, adjacent to and controlling the motor, and the remote control station, for connection there to switching means operable to deenergize the motor or effect its energization and rotation in either direction; more specifically, the connections of the motor to power-line conductors extending between the motor and the remote control station are varied by a relay, at the motor or controlled station, whose contact structure has three significant postions; one effecting connections to the motor for rotation in one direction; another establishing such connections to the motor that it rotates in opposite direction, and a third for deenergizing the motor by suitably disconnecting it from the power supply; and the energization of the relay to effect any of these three significant positions is controlled at the remote control station by switching means operable to connect the single control conductor to one or another of the power-line conductors, or to disconnect it therefrom.

My invention is of especial value for the control of apparatus having movements of translation, such as overhead traveling conveyor apparatus. In the common form of such apparatus, bus-bars or conductors are provided lengthwise of the supporting rail, and also lengthwise of a bridge where the traveling mechanism is supported from two rails, the bus-bars or conductors serving both for the supply of power to the various motors (hoist and traction motors), and for the control of such motors. These bus-bars or conductors necessarily extend along the length of the aforesaid rail or rails and are frequently of great length. In prior control systems known to me, a separate bus-bar or conductor has been provided for the control of each of the operations of the hoist motor, and the forward and rearward movements of the traction motor or motors. This multiplicity of bus-bars or conductors is an important item in the cost and maintenance of these control systems, and the desirability of reducing the number of bus-bars or conductors employed for the control operations, has long been recognized.

In a preferred form of the invention as applied to the control of direction or rotation of rotor or rotors of a motor or motors of an overhead conveyor system, there is provided a common connection between, for example, two relay or magnet coils constituting an electromagnetic reversing switch which joins said connection, through a sliding contact shoe, to a control conductor or busbar. The current normally passes through both coils of said switch, but is so distributed therebetween that neither of the coils actuates its associated armature. The arrangement is such that, through the associated control bus-bar or conductor, one or the other of the magnet coils can be short-circuited by means of a push-button or other switch at the control station. When this switch is closed, the other magnet coil is subjected to the full voltage of the supply line and accordingly attracts its armature and closes a switch which effects or controls reversal of a motor of the conveyor system. Upon release of the pushbutton, the magnet coils are restored to their series connection and the armature is withdrawn, as by a spring, to its switch-opening position, since the voltage drop and current resultant therefrom across the coil is insufficient to keep the armature attracted. The hoist or tractor unit or other mechanism operated by the electric circuit is thus brought to rest and the unit is ready for the next operation.

The inventive idea involved is capable of receiving a variety of expressions some of which are shown in the accompanying drawings, but it is to be expressly understood that said drawings are employed merely for the purpose of illustrating the invention as a whole, and not to define the limits thereof, reference being had to the appended claims for this purpose.

In the drawings:

Figure 1 is a diagrammatic view of a control circuit, illustrating the principles of the invention.

Figure 2 is a fragmentary view of an overhead conveyor system of standard construction, in which is incorporated the improved control circuit shown in Figure 1.

Figure 3 is a diagrammatical view of a system for controlling a larger number of operations, and, Figure 4 is a similar view of a circuit showing another form of control circuit made in accordance with the present invention.

Referring to Figs. 1 and 2, the numerals 10, 11 and 12 represent three conductor rails suspended, for example, from the ceiling of a plant and connected to the lines of a three-phase power-supply. These rails are contacted by trolleys 13, 14 and 15, respectively, which are connected to bus-bars 16, 17 and 18, respectively, insulatedly mounted upon the bridge 19 of a traveling crane or the like, the connections being effected by way of the conductors 20, 21 and 22. Also mounted on the bridge 19 is a control bus-bar 26 whose function will be explained more fully hereinbelow.

The bus-bars 17 and 18 are connected by way of the conductors 27 and 28, respectively, and the control bar 26 is connected, by the conductor 29, to the terminals of a reversing switch device 30 which is in fixed relation to the bridge 19. The switching device 30 includes two series-connected coils 31, 32 through which the current normally passes in series. The voltage, that of one of the three phases of the power supply normally obtaining between the conductors 27 and 28 of that one phase is thus divided between the two coils, neither coil being then operative to close the associated circuit leading to the coils of the traction motor M, two of whose terminals are connected to the switch device by way of the conductors 33 and 34, and whose third terminal connects with bus-bar 16.

The control of the device 30 at a remote point is effected by means of a pendant switch shown diagrammatically at 35, the switch having a sliding connection, by way of the conductor 36 to the control bus-bar 26, which, like the other bus-bars, extends along the length of the bridge. Switches 30 and 35 are both in circuit with a primary power source, namely, bus-bars 17 and 18, and are connected by the single line control circuit 36, 26 and 29. It will be noted that the conductor 29 leading from the control bar 26 is connected to both of the coils 31, 32, and that the latter are connected to the bus-bars 17 and 18 through the conductors 27 and 28, respectively, so that under normal conditions a limited amount of current flows through both coils in series and the reversing switch 30 remains inactive. Upon closing of, for example, the contacts 35, 39, a circuit is closed from the power supply line 11 to bus-bar 17, the sliding shoe contact 23 engaged therewith, conductor 37, said contacts 39, 35, conductor 36, sliding contact 24, control bus-bar 26, conductor 29, coil 32 of the reversing switch, and from thence through the conductors 25, 28 and bus-bar 18 to the supply line 12. Thus, the coil 31 is short-circuited through the control bar 26 and switch 35, 39, and the full line voltage is now impressed on the coil 32 so that it becomes operative to attract its armature and close a circuit to the motor M, through conductors 27, 28, causing the latter to rotate in the direction corresponding to the direction of operation of the switch 35. When the switch 35 is returned to its neutral or inoperative position, the armature of the coil 32 restores since there is no voltage impressed upon either coil 31 or 32, contact 32c having been broken upon initial movement of the armature actuated by coil 32. When said armature is restored, the full line voltage is divided between both coils, and the circuit for said motor is opened. Similarly, upon engagement of contact 40 by the switch member 35, the coil 32 becomes short-circuited, since the power supply lines then become connected through the control bar 26, coil 31 and conductors 25a, 27, whereupon the circuit to the motor M is closed and the latter is caused to rotate in the opposite direction from that first described because of reversal of connections of motor terminals 33 and 34 with respect to power bus-bars 17 and 18 respectively.

It will be noted that although two control operations are effected, namely the forward and reverse movement of the motor M, and a three-phase system is employed, only four bus-bars are required upon the bridge 19, that is, only one more than corresponds to the power line conductors 10, 11, 12. These two control operations are thus accomplished with the aid of only a single additional bus-bar, in contradistinction to prior circuits for the remote control of two operations, wherein two or more additional bus-bars have been required. It will also be noted that only three conductors from the remote control station to the bridge are required, whereas formerly at least four or more had to be employed.

By a further reference to Fig. 2, in which a conventional arrangement of the elements of an overhead conveyor system is illustrated, it will be seen that the bridge 19 is suspended from a track system comprising the I-beams 46 by means of trolleys 47, and is designed to travel along said beams through the medium of the drive wheels 48 carried at the ends of the shaft 49 which is operated in the customary manner from the traction motor M fixedly mounted upon said bridge. The bus-bars 16, 17, 18 and 26 are also insulatedly carried by said bridge, and the line conductors 10, 11 and 12 for supplying current to said bus-bars are mounted upon a block of insulation 50. Said bridge, which may also be in the form of an I-beam, supports and forms a track for a carriage, generally indicated at 51, for movement therealong under the control of the traction motor 52. This carriage also supports the hoist mechanism conventionally shown at 53, and disposed between the latter and the motor 52 is a terminal box 54 which may contain an ordinary reversing switch 55 for controlling the motor 52. The remote control station of the embodiment being described is shown in the form of a pendant switch box 56 which includes the switch 35 and also a switch 57 for operating the switch 55.

Fig. 3 shows a somewhat more complex control system whereby four different control operations, namely, the forward and reverse movements of, for example, a traction motor, and the raising and lowering of a hoist hook of an overhead traveling crane are carried out with the aid of only a single additional bus-bar for each two controlled operations, in addition to the line conductors, which in the case of a three-phase system are three in number, or two together with the ground (e. g. the supporting rail), the latter then acting as the third conductor.

In the arrangement shown in Fig. 3 the remote control station is fixed, but it may of course be movable, as in the form of a pendant switch shown in Fig. 1, in which case the leads from the control station will contact the bus-bars by way of sliding shoes. In Fig. 3, the reversing switching device 30a, which may be termed a relay, controls the raising and lowering movements of the hoist motor, while the similar device 30b controls the forward and rearward movements of the traction motor. The system is three-phase, the line conductors being connected to the bus-bars $L_1$, $L_2$, and $L_3$. The remote control station is indicated at 41 and may be in the form of push-button switches, reversing controllers or contact making and breaking devices 41a to 41d. The operation of said switches and results obtained thereby will be described hereinbelow.

Referring to the relay 30a, it will be noted that in the normal condition of the control switches 41a to 41d, the coils 31a and 32a are connected in series to the line conductors associated with the bus-bars L1, L2 by way of the conductors 42, 42a, 42b, 42c and 42d. Under these conditions, the coils remain inoperative to actuate their armatures, the characteristics thereof being such that they remain inoperative at the partial line voltage across each coil, and hence the circuit to the hoist motor is open. Upon depression of the button 41d, the bars L'2 and C' are connected across the normally closed terminals of the switch 41c to close a circuit for coil 31a extending from bar L1 through conductors 42d and 42c, the coil 31a, conductors 42b and 44, busbar C, conductor C', lower contacts of switch 41d and upper contacts of switch 41c, and from thence through the conductor L'2 to the busbar L2. Coil 32a is thus short-circuited, and coil 31a has connected thereto the full line voltage, causing it to energize and attract its armature. A circuit for the hoist motor is thereby established from the bars L1 and L2 through conductors 43a and 43b, contacts 43c closed by the armature of relay 31a, and through conductors T1 and T2, causing the motor to operate to effect lifting of a load.

Similarly, upon depression of the switch 41c, coil 31a is short-circuited, and a circuit is established for coil 32a extending from bus-bar L1 through conductor L'1, upper and lower contacts, respectively, of switches 41d and 41c, conductor C', bus-bar C, conductor 44, coil 32a, and conductors 42a and 42 to bus-bar L2. The coil 32a then attracts its armature and closes a reversed circuit to the hoist motor through the conductors 45a, 45b contacts 45c of the armature of coil 32a, and the conductors T1 and T2.

In similar manner, the additional conductor D is caused to short-circuit one or the other of coils 31b, 32b in the relay 30b, upon depression of the push-button 41a or 41b to effect rotation of the "tractor motor" in forward or reverse direction. As the connections of relay or reversing switch 30b are the same as those of relay 30a, the detailed description of the latter will suffice also for the relay 30b.

It will thus be seen that but a single additional conductor is provided for each relay, and that through this conductor, by way of the switches located at the control station, and in association with the line conductors or leads running therefrom, one or the other of the series coils of each relay is short-circuited, and the controlled machine, such as a motor, actuated correspondingly. Thus, in a control system which is operable to control four different operations, only two additional bus-bars are necessary, in contrast to the four or more additional bus-bars that have heretofore been found to be necessary; while only four leads need be run to the control station in place of the five or more that have heretofore been employed.

The principle of selectively effecting more than one operation in a control station, as exemplified in the form of the invention above described, may also be carried out in the manner diagrammatically illustrated in Figure 4. Herein, a switching device, generally indicated at 58, may consist of three coils 59, 60 and 61 having a common conductor 62, and respectively connected to the line conductors L1, L2 and L3 by a control switch 63 joined to the conductor 62, and designed to engage any one of three terminals associated with conductors 64, 65 and 66 connected to the supply lines L1, L2, L3, respectively. With such arrangement, two of the coils are maintained energized by being bridged across two of the line conductors, while the third coil is short-circuited to accomplish a selected operation. Thus, with the switch 63 on the terminal of the conductor 65, as shown, it will be apparent that the coil 60 is short-circuited through the control 62, while the other two coils 59 and 61 will be connected in series across the lines L1 and L3.

From the foregoing, it will be apparent that by the employment of reversing switches of the type above described, I am able to effect a greater simplification in the control circuits of a remote control system, particularly of a traveling system. The reduction in the number of bus-bars, which of course extend throughout the whole length of lateral travel of the hoist motor in the embodiment shown in Fig. 2, effects a very considerable saving in the initial cost of the conveyor system and also in the upkeep, and the same is true of the conductors running from the bridge to the remote control station.

What is claimed is:

1. In a control system, the combination with a conveyor motor, of a relay associated with the motor and operable to effect rotation of the latter in one or the other direction, line conductors, a single additional conductor associated with the relay and the line conductors, and a switch connected to the additional conductor and movable to connect the latter with one or the other of the line conductors to actuate the relay in one or another sense to cause rotation of the motor in one or the opposite direction.

2. In a control system, the combination with a motor movable in one or the other direction, of a relay associated with the motor and having two coils connected in series across the line conductors, said coils being of such characteristics that they remain inoperative at the partial line voltage thereacross, motor circuits controlled by said relay, an additional conductor connected to both said coils, and a switch operable to connect said additional conductor to one or the other of the line conductors to short circuit one of said coils and thereby throw the whole line voltage across the other coil to effect a change in the condition of a selected one of the motor circuits.

3. In a remote control system for an overhead crane having a plurality of motors for effecting movement of the crane in one or the opposite direction and for raising and lowering a load, the combination of electric circuits for causing operation of said motors in one or the other direction, bus-bars connected to the power lines, an electrically operated switch mechanism associated with each of said motors and controlling its electrical circuits, said switch mechanisms each comprising a pair of coils connected in series across the power bus-bars, the characteristics of said coils being such that they remain inoperative at the partial line voltage thereacross, a single additional bus-bar for each relay connected to both of said coils, a remote control station, leads running from the control station to the bus-bars, and switches at said control station each adapted to connect either of the power bus-bar leads, selectively, to the additional bus-bar associated with a particular relay to cause short circuiting of one or the other of the coils of said relay and thereby causing operation of the associated motor in a selected direction.

4. A system comprising a reversible motor at a controlled station, power conductors extending to said station for energization of said motor, and means for effecting from a remote control station rotation of said motor in either direction comprising a single control conductor extending between said stations, a relay at said controlled station there connected to said control conductor and whose contact structure has one position for which the motor is energized from said power conductors for rotation in one direction and a second position for which the motor is energized from said power conductors for rotation in reverse direction, and a control switch option in reverse direction, and a control switch operable at said remote control station there to effect connection of said control conductor to one or another of said power-line conductors to effect movement of said relay contact structure to the desired one of its aforesaid motor-energizing positions.

5. A system comprising a reversible motor at a controlled station, power-line conductors extending to said station for energization of said motor, a multi-coil relay at said station for effecting and reversing connections from said motor to said power-line conductors, a single control conductor extending from said relay to a remote control station, and switching means at said last-named station for connecting said control conductor selectively to one or another of said power-line conductors fully to energize a selected coil of said relay for causing said motor to rotate in one direction or the other, and for disconnecting said control conductor to effect partial energization of said coils for rendering said motor inoperative.

6. A system comprising a polyphase motor at a controlled station, a polyphase power line extending to said station for energization of said motor, and means for effecting from a remote control station deenergization of said motor and energization thereof from said power line for rotation in either direction comprising a relay having coils connected in series across one phase of said power line and having contact structure operable to connect said motor to said line for rotation in one direction when one of said coils is alone energized, for reversing connections from the motor to said polyphase power line to reverse said motor when another of said coils is alone energized, and for deenergizing the motor to stop it when the coils are energized in series, a single control conductor extending from a common terminal of said coils to the remote control station, and switching means thereat operable to connect said control conductor to one or the other conductors of aforesaid one phase, or to open its circuit, selectively to effect full energization of one or the other only of said coils or partial energization of both of them.

7. A conveyor system comprising a track, a vehicle movable along said track, a reversible motor on said vehicle, power conductors extending along said track for energization of said motor, and means for controlling from a remote station rotation in either direction or deenergization of said motor comprising a single control conductor extending along said track, a relay on said vehicle connected to said control conductor and whose contact structure has one position for which the motor is energized from said power conductors for rotation in one direction, a second position for which the motor is energized from said power conductors for rotation in reverse direction, and a third position for which the motor is inoperative, and switching means operable at said remote control station there operable at said remote control station there to control energization of said relay by connection of said control conductor to one or another of said power-line conductors, or to open its circuit, and so effect movement of said relay contact structure to the selected one of its aforesaid positions.

8. A conveyor system comprising a track, a vehicle movable along said track, a reversible motor for driving said vehicle and mounted thereon, power conductors extending along said track for energization of said driving motor, and means for controlling from a remote station movement in either direction, or interruption of movement, of said vehicle comprising a single control conductor extending along said track, a relay on said vehicle connected to said control conductor and whose contact structure has one position for which the motor is energized from said power conductors for rotation in one direction, a second position for which the motor is energized from said power conductors for rotation in reverse direction, and a third position for which the motor is inoperative, and switching means operable at said remote control station there to control energization of said relay by connection of said control conductor to one or another of said power-line conductors, or to open its circuit, and so effect movement of said relay contact structure to the selected one of its aforesaid positions.

9. A conveyor system comprising a track, a vehicle movable along the track, a hoisting motor on said vehicle for raising or lowering a load, power conductors extending adjacent said track for energization of said motor, and means for controlling from a remote station hoisting or lowering of a load by said motor comprising a single control conductor extending along said track, a relay on said vehicle connected to said control conductor and whose contact structure has one position for which the motor is energized from said power conductors for rotation in one direction, a second position for which the motor is energized from said power conductors for rotation in reverse direction, and a third position for which the motor is inoperative, and switching means operable at said remote control station there to control energization of said relay by connection of said control conductor to one or another of said power-line conductors, or to open its circuit, and so effect movement of said relay contact structure to the selected one of its aforesaid positions.

10. A system comprising a reversible polyphase motor, power-line conductors from which said motor is energizable, and means for effecting reversal of said motor comprising a relay having a plurality of coils and contact structure controlled thereby, a single control conductor extending from said relay to a remote control station, switching means at said station for connecting said control conductor to one or the other of a pair of said power-line conductors, said coils for one position of said switching means effecting connection of said coils in series with each other across said pair of power-line conductors, and in another position short-circuiting one of said coils through said control conductor, said contact structure partaking of positions depending, respectively, upon connection of said coils in series and upon short-circuit of one of them, for rendering said motor operative or inoperative.

11. A system comprising a reversible motor, power-line conductors from which said motor is energizable, and means for effecting reversal of said motor comprising a relay having a plurality of coils energizable from said conductors, relay contact structure for connecting said coils in series with each other across said conductors, a single control conductor extending from said relay to a remote control station, switching means at said last-named station for connecting said control conductor to one or another of said conductors thereby to effect full energization of one or the other of said coils to actuate said contact structure to open the circuit of the other of said coils, said switching means movable to neutral position to deenergize said one or the other of said coils until said contact structure restores aforesaid series connection of said coils, and relay contact structure operable to render the motor inoperative or to render it operative for rotation in desired direction in accordance with the position of said switching means.

BEMIS E. MILLER.

CERTIFICATE OF CORRECTION.

Patent No. 2,156,636.  May 2, 1939.

BEMIS E. MILLER.

It is hereby certified that error appears in the printed specification of the above numbered patent requiring correction as follows: Page 1, second column, line 4, for the words "direction or" read direction of; page 3, first column, line 40, after "45b" insert a comma; line 75, for "L2, L2" read L1, L2; page 4, second column, line 70, claim 10, for "posiitons" read positions; and that the said Letters Patent should be read with this correction therein that the same may conform to the record of the case in the Patent Office.

Signed and sealed this 4th day of July, A. D. 1939.

Henry Van Arsdale

Acting Commissioner of Patents.

(Seal)